Oct. 6, 1953     K. E. PEILER     2,654,186
GLASS FEEDER REFRACTORY IMPLEMENT CHUCK
Original Filed April 21, 1949
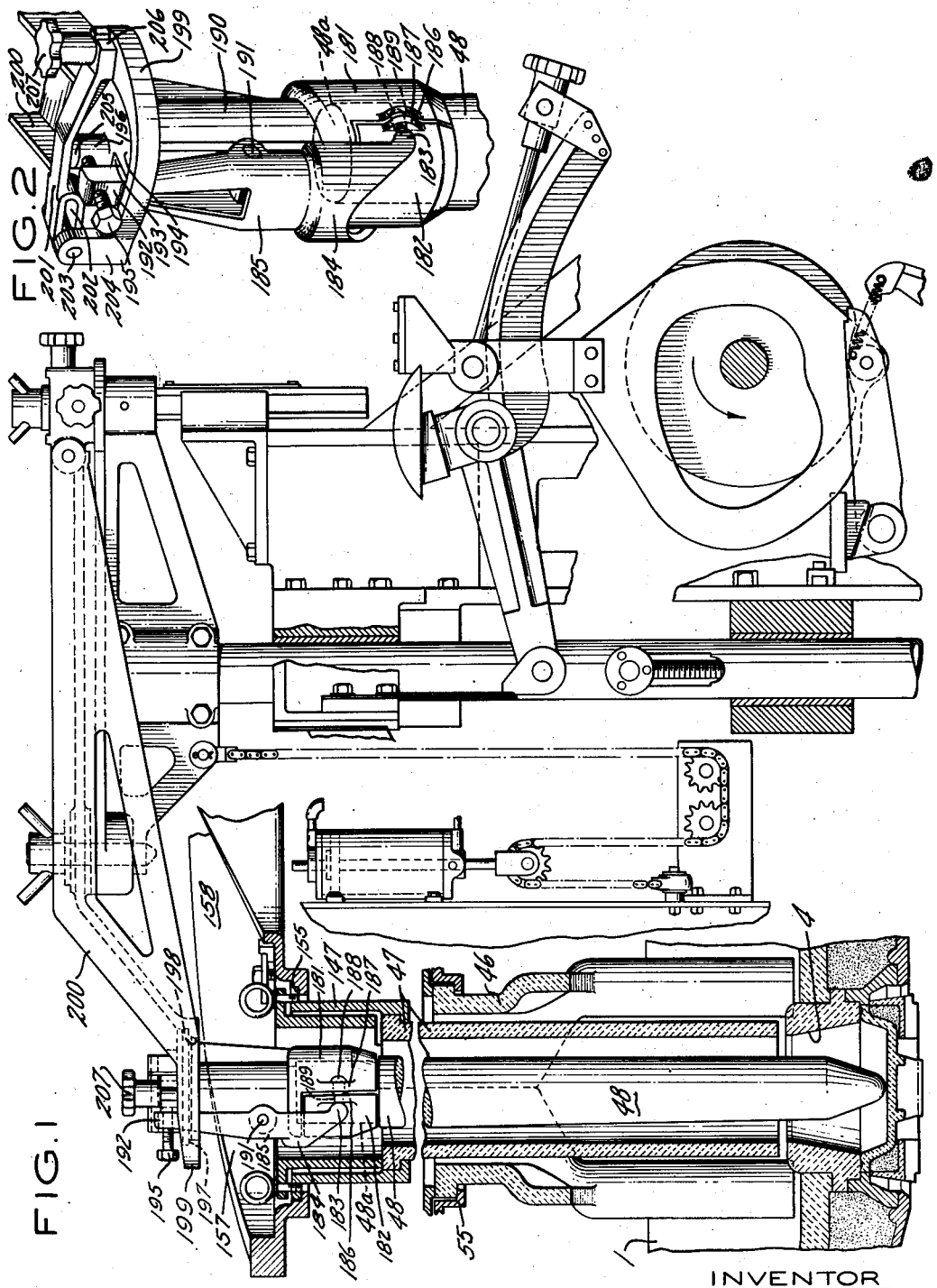
INVENTOR
KARL E. PEILER
BY *Parham + Bates*
ATTORNEYS Patented Oct. 6, 1953

2,654,186

UNITED STATES PATENT OFFICE 2,654,186

GLASS FEEDER REFRACTORY IMPLEMENT CHUCK

Karl E. Peiler, West Hartford, Conn., assignor to Emhart Manufacturing Company, a corporation of Delaware Original application April 21, 1949, Serial No. 88,869. Divided and this application April 17, 1952, Serial No. 282,887

5 Claims. (Cl. 49—55)

This application is a division of my co-pending application, Serial No. 88,869, filed April 21, 1949, for an improvement in glass feeding apparatus. It is filed for the purpose of claiming the invention disclosed therein directed to a novel means for replaceably holding a vertically reciprocating refractory implement which depends in a glass feeding container in working relation to an outlet passage in the bottom of the container.

An object of the invention is to provide, in a chuck or supporting holder for the refractory implement referred to, a novel arrangement of implement upper end clamping or gripping members releasably and resiliently maintained in firm gripping relation to the upper end portion of the implement.

A further object of the invention is to provide a novel chuck or holder for gripping the upper end of the implement referred to to support the implement for vertical reciprocation without the use of a holding pin or the like extending into a drilled hole or socket in the upper end portion of the refractory implement as heretofore has been customary.

Other objects and advantages of the invention hereinafter will be pointed out or will be apparent from the following description of a practical embodiment of such invention as illustrated in the accompanying drawings, in which:

Fig. 1 is a partial view, showing feeder bowl outlet structure and glass homogenizing and feed controlling means in transverse vertical section and in elevation means, including the novel chuck or implement holder of the present invention for mounting and vertically reciprocating a vertical refractory implement or plunger; and Fig. 2 is a fragmentary relatively enlarged perspective of the implement chuck or holder.

A feed bowl or container, a fragmentary bottom portion of which is shown in Fig. 1 and is designated 1, has an outlet or feed passage 4 in its bottom.

A rotary member 46, supported by a rotor chuck 55, depends into the bowl or container 1 in axial alignment with the outlet passage.

A refractory tube 47 is suspended from an annular chuck 147, mounted in a seat 155 in an end portion 157 of a tube supporting arm 158. The tube depends into the feed bowl or container 1 within the rotary outer member 46 and also in axial alignment with the outlet passage.

Within the tube 47 and with its lower end in working relation to the outlet passage is a vertical refractory implement or plunger 48, the chuck or holder for which embodies the invention of the present divisional application.

The refractory implement or plunger 48 is suspended from a chuck which, as best seen in Fig. 2, comprises a generally cylindrical lower portion comprising a main clamping part 181 and a segmental movable cooperative clamping part 182. These two clamping parts together embrace and grip the upper end portion 48a of the plunger when the movable part 182 is pressed by forks 183 of a lower end portion 184 of a clamp lever 185 against the plunger upper end portion in the main clamping part 181. To retain the clamping parts 181 and 182 in cooperative relation while permitting relative opening and closing movements thereof, these parts may be provided at their adjacent side edges with matching lugs or ears 186 and 187, respectively. One of these, as the lug or ear 187 on the clamping part 181, carries a guide pin 188 slidable in an opening 189 in the cooperative ear or lug.

The main clamping part 181 is suspended by an integral vertical shank 190, which may be substantially U-shaped or semi-cylindrical in cross-section. The clamp lever 185 is pivoted at 191 intermediately to the shank 190 so that the lever may swing within limits about a transversely extending horizontal axis and the upper end portion of the lever, which is of reduced size and block-like form as indicated at 192, projects upwardly through a radial notch 193 in a flat circular head 194 formed on the upper end of the suspension shank 190. A thrust bolt 195 is threaded through the upper end portion of the lever to bear against an upstanding central boss 196 on the head 194. The head 194 rests in a counter-bored seat 197, Fig. 1, formed as the upper part of a chuck accommodating opening 198 defined by an annular outer end portion 199 of a plunger carrying, overhanging arm 200. The arm 200 is supported and actuated to reciprocate the plunger by means shown in Fig. 1 but which need not be described herein.

A hold-down lever 201, Fig. 2, has a transverse slot 202 in an end portion thereof through which extends a pin 203 carried by a pair of upstanding ears 204 on the ring-shaped end portion 199 of the arm 200. This hold-down lever 201 has a depending boss 205 bearing on the boss 196 on the head 194 when the lever 201 has been swung downwardly about the axis of the pin 203 until a vertically notched opposite end portion 206 of the lever rests upon the ring member 199 at the side of the latter opposite the ears 204. A shouldered fastening bolt 207 extends downwardly through the notched end of the lever 201 into the ring member 199 to maintain the lever 201 in its active, holding position. When the bolt 207 has been disengaged from the ring member, the lever 201 may be swung upwardly and slid longitudinally for a limited distance about the pin 203 so as to be out of the way of the chuck and the suspended refractory plunger 48. These then may be lifted through the ring member 199 and for this purpose a hoist (not shown) may be attached in a conventional or any suitable manner.

When the clamp lever 185 is in its operative position so that its forks 183 press the movable clamping section 182 firmly against the upper end of the plunger 48 in the main clamping part 181, the action will be sufficiently resilient or spring-like to assure a strong clamping action continuously on the plunger throughout normal temperature changes and attendant expansion and contraction of the parts of the chuck and of the suspended refractory plunger. The plunger thus is prevented from slipping out of the chuck without the use of a holding pin or the like extending into a drilled hole or socket in the plunger as heretofore has been customary.

I claim:

1. In glass feeding apparatus, a supporting arm having an end portion formed to provide a vertically open frame having an upwardly facing counterbored seat, a chuck comprising a head fitting removably in said frame so as to be supported by said seat, a vertical shank depending from said head, a main clamping part integral with the lower end of the shank, a movable co-operative clamping part mounted on the main clamping part for opening and closing movements relative thereto, said clamping parts being formed as segments of a cylinder so as to be adapted to embrace and grip between them a cylindrical upper end portion of an elongate vertical refractory implement so that the implement will depend into a glass container with the lower end of the implement positioned in co-operative relation to a vertical outlet passage in the bottom of the container, a vertically disposed lever pivoted intermediately on said shank to swing about a horizontal axis, the lower end of said lever being forked and bearing against the outer surface of the movable clamping part, said head of the chuck having an aperture in a portion thereof and the upper end portion of said lever extending loosely through said aperture, said head also having an upstanding central boss thereon, and a thrust bolt threaded through the upper end portion of the lever and bearing against said boss to adjust the pressure of the forked lower end of the lever on the movable clamping part, said lever being sufficiently resilient to assure a strong clamping action by the clamping parts continuously on the refractory implement throughout normal temperature changes in service.

2. In glass feeding apparatus, a supporting arm having an end portion formed to provide a vertically open frame having an upwardly facing counterbored seat, a chuck comprising a head fitting removably in said frame so as to be supported by said seat, a vertical shank depending from said head, a clamp carried by said shank and comprising a plurality of openable and closable grippers for gripping between them the upper end portion of an elongate refractory implement so that said implement may be supported thereby to depend into a glass container having a vertical outlet passage in its bottom to position the lower end of the implement in co-operative relation to the said outlet passage, and spring means operatively associated with said grippers to maintain them in firm gripping relation to the upper end portion of said implement.

3. The combination defined by claim 2 wherein the upper end portion of said refractory implement is cylindrical and said clamp comprises a main gripper formed as an integral downward extension of said shank and having a contact face of arcuate cross-sectional configuration fitting partly around and smoothly against said cylindrical upper end portion of the implement and a co-operative movable gripper having a similarly shaped contact face fitting smoothly against the periphery of the cylindrical upper end portion of the implement at the side of the latter opposite the main gripper, and wherein said spring means comprises a strong spring lever pivoted on said shank and continuously actuated to force the movable gripper toward the main gripper under a strong spring pressure.

4. The combination defined by claim 2 and, in addition, releasable means on said frame engageable with the head of said chuck to retain it in place in said frame, said chuck and the refractory implement suspended therefrom being movable as a unit upwardly clear of the frame for replacement of the plunger when said releasable means has been disengaged from said head.

5. The combination defined by claim 2 and, in addition, a chuck hold-down lever pivotally mounted at one end on one side of the frame and swingable from an out-of-the-way position at one side of the frame to an active position spanning the frame in bearing contact with the head of the chuck in the frame, and releasable means to secure the hold-down lever to the frame in its active position.

KARL E. PEILER.

References Cited in the file of this patent

UNITED STATES PATENTS

| Number | Name | Date |
| --- | --- | --- |
| 1,761,372 | Stenhouse | June 3, 1930 |
| 1,844,847 | Good | Feb. 9, 1932 |
| 1,884,967 | Algeo et al. | Oct. 25, 1932 |